United States Patent [19]

Ehrmann et al.

[11] Patent Number: 5,139,275
[45] Date of Patent: Aug. 18, 1992

[54] SHAFT SEAL

[75] Inventors: Peter Ehrmann, Hemsbach; Rolf Vogt, Oftersheim; Gerhard Kilthau, Mannheim, all of Fed. Rep. of Germany

[73] Assignee: Firma Carl Freudenberg, Weinheim an der Bergstrasse, Fed. Rep. of Germany

[21] Appl. No.: 403,661

[22] Filed: Sep. 6, 1989

[30] Foreign Application Priority Data

Sep. 29, 1988 [DE] Fed. Rep. of Germany ....... 3833042

[51] Int. Cl.[5] .............................................. F16J 15/32
[52] U.S. Cl. .................................. 277/134; 277/152
[58] Field of Search ............... 277/134, 133, 152, 153, 277/297 R

[56] References Cited

U.S. PATENT DOCUMENTS

| | | | |
|---|---|---|---|
| 3,589,739 | 6/1971 | Scholten | 277/134 X |
| 3,895,814 | 7/1975 | Kupfert et al. | 277/134 |
| 3,973,781 | 8/1976 | Grörich | 277/153 X |
| 4,174,845 | 11/1979 | Hadaway | 277/134 |
| 4,300,777 | 11/1981 | Symons | 277/134 X |
| 4,616,836 | 10/1986 | Drygalski et al. | 277/134 X |

FOREIGN PATENT DOCUMENTS

| | | | |
|---|---|---|---|
| 1101074 | 3/1961 | Fed. Rep. of Germany | 277/134 |
| 2453118 | 6/1975 | Fed. Rep. of Germany . | |
| 611018 | 10/1960 | Italy | 277/134 |
| 150666 | 11/1981 | Japan | 277/134 |
| 1459352 | 12/1976 | United Kingdom . | |

*Primary Examiner*—William A. Cuchlinski, Jr.
*Assistant Examiner*—Scott W. Cummings
*Attorney, Agent, or Firm*—Felfe & Lynch

[57] ABSTRACT

A shaft seal including a reinforcement ring 1 with a lip ring 2 made of a polymeric material which is connected thereto and which is provided with a cylindrical surface 4 surrounding a shaft 3 at a certain distance and with projecting retaining bodies having flow bounding surfaces disposed in radial direction of the aforesaid cylindrical surface, and the aforesaid flow bounding surfaces are associated with the longitudinal direction of the shaft at an acute angle. The free spaces 6 which are enclosed by the cylindrical surface 4, the shaft 3, and the retaining bodies 5 during non-rotation or standstill of the shaft are of capillary-active narrowness and axially completely open in direction toward the space to be sealed as well as in the opposite direction.

14 Claims, 2 Drawing Sheets

SHAFT SEAL

The invention relates to a shaft seal.

German DE-AS 24 53 118 discloses such a shaft seal having rib-like configured retaining bodies. Together with the longitudinal direction of the shaft they enclose an inclined angle such that, during rotation of the shaft, hydrodynamic effective forces, directed toward the space to be sealed, are applied to the oil contained in the free spaces. The free spaces, however, are closed with respect to the aforesaid direction which generates a pressure increase in the free spaces and, finally, as a consequence thereof, the lip ring is lifted off the surface of the shaft to be sealed about during very high rotation speeds. Hence, such a shaft seal is under regular operating conditions almost free of wear. The effect intended, however, lasts only a very short time.

It is an object of the invention to further develop such a shaft seal such that there is a significant wear reduction even in case of numerous interruptions of the shaft rotation during a long-term use.

The object is achieved with a shaft seal of the aforementioned kind in accordance with the invention according to claim 1. The subclaims relate to preferred embodiments.

In the shaft seal in accordance with the invention the free spaces surrounded by the cylinder surface, the shaft, and the retaining bodies are of capillary-active narrowness during non-rotation of the shaft, and therefore during rotation and non-rotation of the shaft the aforesaid free spaces are constantly completely filled with medium to be sealed. The risk of a mixture between medium and air is thus already significantly reduced and hence, if lubricating oil is sealed also the risk of generating oil carbon is reduced.

Further, in the shaft to be sealed about in accordance with the invention there is, as compared to prior art, already a significantly improved initial lubrication since the free spaces are completely filled with medium to be sealed; this is a condition which is already present during standstill of the shaft. The medium to be sealed which is contained in the free spaces is in case of a relative rotation of the shaft immediately transferred to the front surfaces of the retaining bodies contacting the shaft and immediately forms a self-contained, continuous lubricating film. Already at an average rotational speed, the film achieves a radial extension which by far surpasses the one of the flow bounding surfaces. Hence, the effect generated in this case is basically only a circulation of the liquid film in itself; the axial transporting component directed toward the space to be sealed is correspondingly reduced. The only consequence is a continuous reproduction of minor residual volumes of lubricating liquid contained in the sealing gap, a fact which is indeed desired.

The free spaces of the lip ring of the shaft seal in accordance with the invention are axially completely open in direction toward the space to be sealed as well as in the opposite direction; hence, there are no parts of the lip ring present in the area of the dynamic sealing zone which could be subject to a material damage caused by overheating as consequence of unfavorable operating conditions.

The risk of oil carbon generation is correspondingly reduced while the capillary-active narrowness of the free spaces ensures a sufficient sealing of pressure-free spaces during shaft standstill; in this case, the risk of leaking of medium to be sealed is also eliminated.

In the shaft seal in accordance with the invention, the retaining bodies can be configured rib-like which permits obtaining a slightly more intensive transporting effect with the present embodiment. Generally, however, retaining bodies having a nub-like configuration are preferred. Especially this case brings about a very good mixing of all components of the liquid film which forms under regular operating conditions between sealing lip and surface of the shaft to be sealed about.

Regardless whether the retaining bodies have a rib-like or a nub-like configuration, it proved to be advantageous that the bodies be defined by two converging inclined surfaces. The contact surface at the shaft to be sealed about resulting from shaft standstill is correspondingly reduced to a minimum with regard to size. The aforesaid surface is basically created as a consequence of the elastic deformation to which the retaining bodies are subject by being pressed against the surface of the shaft to be sealed about.

In cases when the inclined surfaces basically extend to the longitudinal extension of the shaft axis, it proved to be advantageous when the inclined surface facing the space to be sealed is associated with the axis of the shaft under a more acute angle than the axially opposed inclined surface. The transporting component directed toward the space to be sealed is thus intensified during rotation of the shaft.

The individual retaining bodies can be associated with each other based on continuous imaginary lines which permits intensifying the transporting effect caused by them in the one or in the other direction. Correspondingly, it is possible to dispose the individual retaining bodies based on imaginary lines which have a straight or curved configuration. It is also possible to dispose the bodies based on imaginary lines which have an S-like configuration and, if necessary, join each other. Regularly, the cylindrical surface has a larger axial extension than the total of all the retaining bodies.

In the area of the dynamic sealing zone, the sealing lip of the shaft seal in accordance with the invention can be provided with retaining bodies having a certain spacing to each other in axial direction. The total axial transport effect can thus be significantly reduced; a fact which is particularly noticeable when the gaps formed by the free spaces of retaining bodies adjacent in circumferential direction are disposed on the same radial plane of the shaft axis.

A further increase of the aforesaid effect can be achieved by disposing a continuous supplementary rib extending in circumferential direction in the gap and if the said supplementary rib and the retaining body have a basically identical extension in radial direction. Pressure deviations caused by operation within in the space to be sealed can thus be effectively compensated. However, it must be ensured that the retaining bodies disposed in direction to the exterior are sufficiently lubricated during initial rotation of the shaft. With respect to this, the radial extension should be slightly smaller than the one of the retaining bodies.

Under regular operating conditions it proved to be advantageous if the gap is disposed in approximately the center area of the axial extension of the cylindrical surface. Interferences of the sealing properties coming from the direction of the space to be sealed as well as from the surrounding area can thus be effectively suppressed.

The achievements of the shaft seal in accordance with the invention include particularly a constantly good sealing effect over longer periods of time. Furthermore, the sealing of lubricating oil suppresses the generation and possible accumulation of oil carbon in the area of the dynamic sealing zone.

In accordance with the invention, a shaft seal comprises a reinforcement ring and a lip ring made of a polymeric material which is connected thereto and which is provided with a cylindrical surface surrounding a shaft at a certain distance and with projecting retaining bodies having flow bounding surfaces disposed in radial direction of the cylindrical surface. The flow bounding surfaces are associated with the longitudinal direction of the shaft at an acute angle. Free spaces bounded by the cylindrical surface, the shaft, and the retaining bodies are of capillary-active narrowness during non-rotation of the shaft. The free spaces are actually completely open in direction toward the space to be sealed as well as in the opposite direction.

For a better understanding of the invention, together with other and further objects thereof, reference is made to the following description, taken in connection with the accompanying drawings, and its scope will be pointed out in the appended claims.

Referring now to the drawings.

Figure 1:
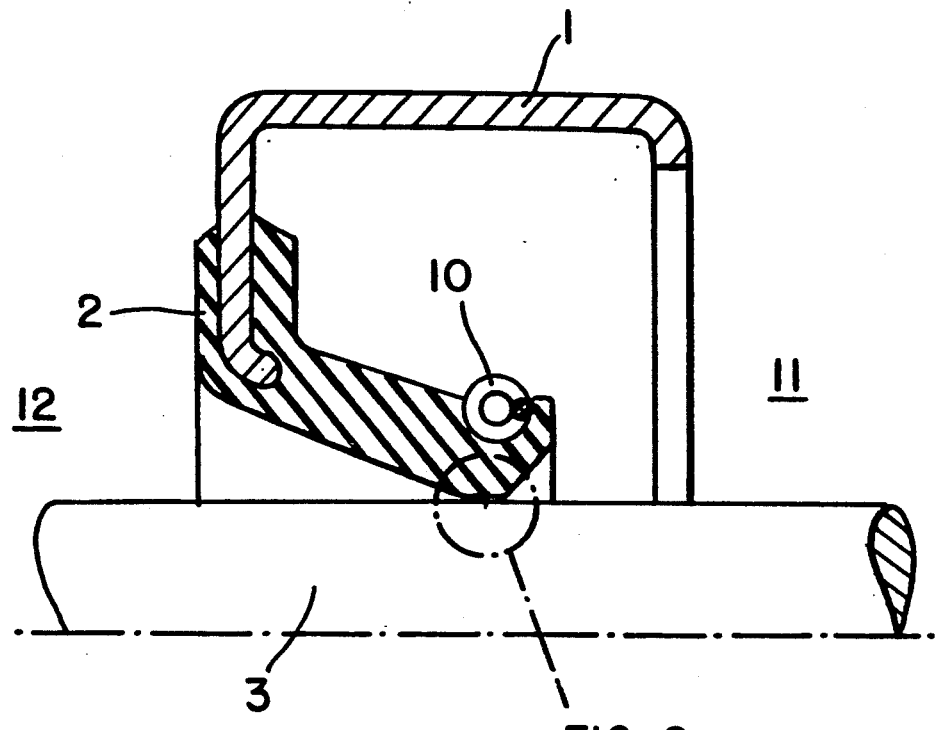
FIG. 1 is a partial cross-sectional view of a shaft seal in accordance with the invention.
Figure 2:
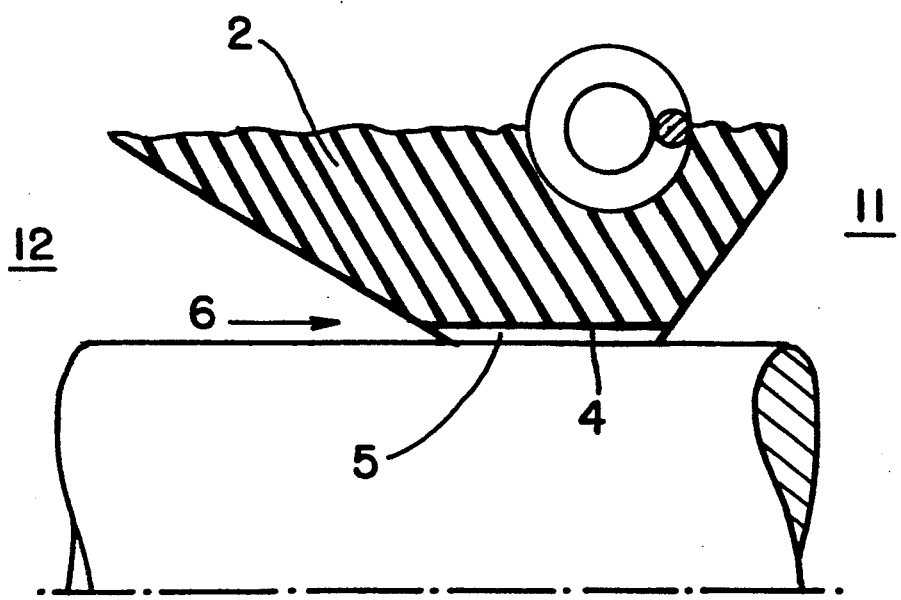
FIG. 2 is an enlarged, fragmentary, cross-sectional view of the dynamic sealing zone of the shaft seal according to FIG. 1.

FIG. 1 shows a shaft seal in accordance with the invention during its intended use in partial cross section. The shaft seal basically includes a metallic reinforcement ring 1 having an angular profile and a lip ring 2 made of rubber elastic material which is attached to the limb directed in radial direction toward the inside by means of vulcanization. The lip ring is provided with a sealing lip with the sealing surface being pressed against the surface of the shaft 3 to be sealed about be means of an annular spring.

Figure 3:
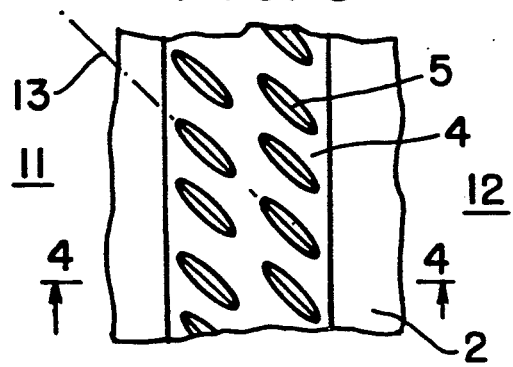
FIGS. 3 to 10 are views of different embodiments of sealing surfaces of the shaft seal in accordance with the invention, each in top plan view and cross-sectional representation.

Referring also to FIG. 3, the sealing surface is subdivided in itself and in the course of manufacture it is provided with the cylindrical surface 4 which coaxially surrounds the shaft to be sealed about during its intended use. The aforesaid sealing surface includes the retaining bodies 5 which project in radial direction toward the inside and are uniformly distributed; the retaining bodies are manufactured together with the lip ring forming one single piece. Generally, the cylindrical surface preferably has an axial length of 0.5 to 2 mm whereas the retaining ribs preferably have a maximum radial extension of 0.1 mm. The free spaces 6 which are, during non-rotation or standstill of the shaft, enclosed by the cylindrical surface 4, the shaft 3, and the retaining body 5 are of capillary-active narrowness and during non-rotation of the shaft are always completely filled with liquid to be sealed. The spaces 6 are axially completely open in direction toward the space 11 to be sealed and in the opposite direction 12.

A few representative configurations of the embodiments are subsequently described based on FIGS. 3 to 10.

In the embodiment according to FIG. 3 the retaining bodies 5 have a rib-like configuration and are disposed along imaginary lines 13 which are configured as a straight lines. As represented in FIG. 3 along their longitudinal extensions and between the retaining bodies, the retaining bodies are interrupted by gaps which are disposed on the same radial plane of the sealing axis. This results in a zone of reduced liquid circulation during the intended use of such a shaft seal.

Pressure changes which have effects from the direction of the space 11 to be sealed or from the opposite direction have thus less disadvantageous effects.

Figure 4:
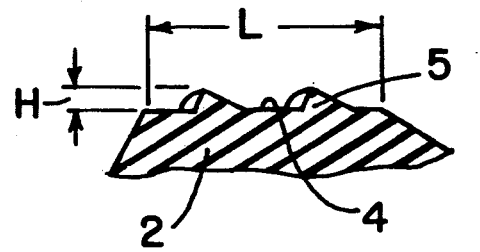

FIG. 4 is a longitudinal cross section view of the aforementioned section of a lip ring of the shaft seal in accordance with the invention shown in top plan view. It can be gathered that the retaining bodies 5 are basically defined by two converging inclined surfaces; the one inclined surface facing the sealed space encloses with the sealing axis a more acute angle than the opposite inclined surface. The axial length of the cylindrical surface is designated as L, the radial extension of the retaining ribs as H.

Figure 5:
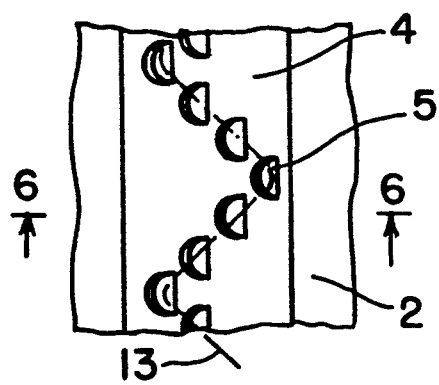
Figure 6:
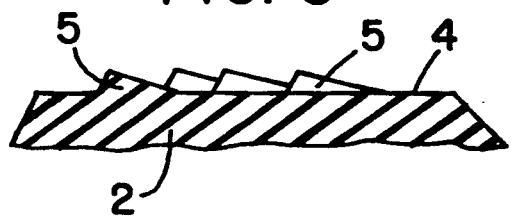

FIGS. 5 and 6 are a top view and a longitudinal cross section of an alternative embodiment of the sealing surface having roof-tile-like configured retaining bodies 5 disposed on the cylindrical surface along an imaginary line 13 which surrounds the shaft to be sealed in a sinusoidal course during its intended use. The individual retaining bodies 5 are in this case, too, only defined by two converging inclined surfaces; one of the aforesaid surfaces, facing toward the surrounding air, is basically flat and the one facing the space to be sealed has an arched configuration. In circumferential direction, the individual retaining bodies are offset at a distance such that there is an overlapping in axial direction.

Figure 7:
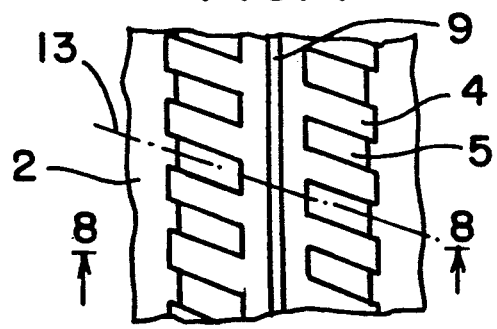
Figure 8:
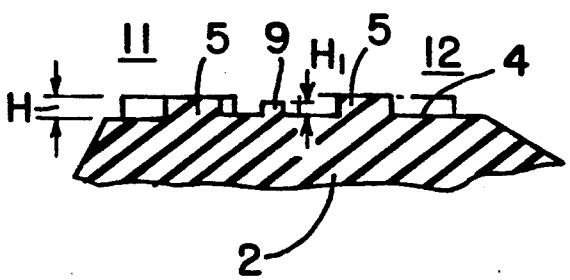

FIGS. 7 and 8 are top views and longitudinal cross section views of an embodiment in which the retaining body 5 is configured as a straight line and disposed along imaginary straight lines 13. Basically, said retaining bodies have a rectangularly defined profile and are, in longitudinal direction, interrupted by gaps which are disposed on the same radial plane of the sealing axis. A continuous, in circumferential direction extending supplementary rib 9 is disposed in the center of the gaps.

The supplementary rib 9 has a height H 1 which is slightly smaller than the height H of the retaining bodies 5. The free spaces which are enclosed by said retaining bodies, the cylindrical surface 4 and the surface of the shaft to be sealed about, are thus also on the side facing toward the surrounding air completely filled with medium to be sealed; this ensure during initial shaft rotation a good lubrication of the parts of the retaining ribs located there. Furthermore, this improves the uniformity of the sealing effect with regard to the pressure stress from any direction.

Figure 9:
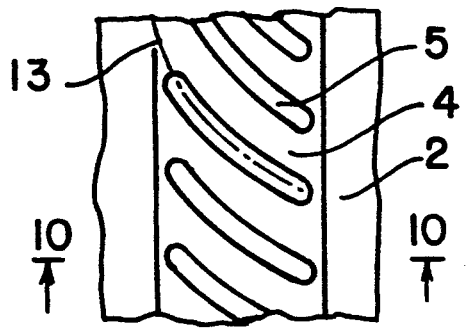
Figure 10:
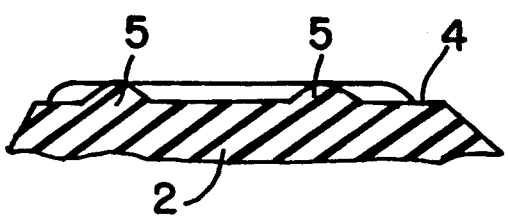

In the embodiments represented in top plan view and cross sectional view in FIGS. 9 and 10, the retaining bodies have a rib-like configuration and conform with a curved course of imaginary lines 13. The profile has a rounded configuration in the projecting part; the flank surface facing the space to be sealed is associated with the sealing axis under a more acute angle than the opposing flank surface. This, too, serves to achieve a stronger transport effect in direction toward the space to be sealed, a fact which ensures a sealing effect.

However, the total transport effect is under regular operating conditions so little that there is no measurable suction effect on the air on the external side of the sealing. Hence, there is no risk of intrusion of foreign matter or oxygen in the area of the dynamic sealing zone and the service life is in this case significantly improved.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A shaft seal comprising: a reinforcement ring; a lip ring made of a polymeric material which is connected thereto and which is provided with a cylindrical surface surrounding a shaft at a certain distance and with projecting retaining bodies having flow bounding surfaces disposed in radial direction of said cylindrical surface, said shaft having an axis in a longitudinal direction and said flow bounding surfaces being associated with the longitudinal direction of the shaft at an acute angle, free spaces bounded by the cylindrical surface, the shaft, and the retaining bodies being of capillary-active narrowness during non-rotation of the shaft and said free spaces being axially completely open in direction toward a space to be sealed as well as in the opposite direction, the cylindrical surface having two axial directions and being spaced outside the retaining bodies in both axial directions.

2. Shaft seal in accordance with claim 1, in which the retaining bodies have rib-like configuration.

3. Shaft seal in accordance with claim 1, in which the retaining bodies have a nub-like configuration.

4. Shaft seal in accordance with claim 2, in which the retaining bodies are defined by only two converging inclined surfaces.

5. Shaft seal in accordance with claim 4, in which the inclined surfaces are basically disposed transversely to the longitudinal direction of the shaft and in which the inclined surface facing the space to be sealed and the axis of the shaft enclose a more acute angle than the axially opposed inclined surface and the axis of the shaft.

6. Shaft seal in accordance with claim 1, in which the retaining bodies are associated with each other based on continuous imaginary lines.

7. Shaft seal in accordance with claim 6, in which the imaginary lines are straight lines.

8. Shaft seal in accordance with claim 6, in which the imaginary lines are curved lines.

9. Shaft seal in accordance with claim 8, in which the imaginary lines are S-like shaped lines.

10. Shaft seal in accordance with claim 9, in which the imaginary lines are configured such that they join each other.

11. Shaft seal in accordance with claim 1, in which there are at least two retaining bodies disposed in axial direction which are separated by a radial spacing.

12. Shaft seal in accordance with claim 11, in which gaps formed by the free spaces are disposed between adjacent retaining bodies on the same radial plane.

13. Shaft seal in accordance with claim 12, in which a continuous supplementary rib extending in circumferential direction is disposed in the gaps and in which the retaining bodies basically have an identical extension in radial direction.

14. Shaft seal in accordance with claim 12, in which the gaps are disposed in a center area axially of the cylindrical surface.

* * * * *